Sept. 3, 1963   A. W. ADKINS ETAL   3,102,655
SUPPORT SYSTEM FOR DOUBLE-WALLED CONTAINERS
Filed March 13, 1962

Bernard C. Hanley
Archibald W. Adkins
    *INVENTORS*

BY
    Agent

United States Patent Office 3,102,655
Patented Sept. 3, 1963

3,102,655
SUPPORT SYSTEM FOR DOUBLE-WALLED CONTAINERS
Archibald W. Adkins, Lincoln, Mass., and Bernard C. Hanley, Los Angeles, Calif., assignors to Arthur D. Little, Inc., Cambridge, Mass., a corporation of Massachusetts
Filed Mar. 13, 1962, Ser. No. 179,339
4 Claims. (Cl. 220—15)

This invention relates to insulating support means for the inner vessel of a double-walled container such as a dewar.

The inner vessels of dewars of larger sizes are customarily supported from the outer vessels at the two ends. The device of this invention provides one of these supports, preferably at the end where the dewar is filled and emptied, which will hereinafter be referred to as the upper end, regardless of its location in space. These support means may also be used at the other (bottom) end, but such use is not necessary when the upper support is constructed in accordance with this invention.

In order to be most effective in a dewar, especially one having at least 100 pounds liquid capacity, the upper support means must have the following characteristics:

(1) Low heat leak to inner vessel.
(2) Capability of allowing for the contraction of the inner vessel when filled with a cryogenic liquid.
(3) Ability to carry load in all directions.
(4) Ability to carry loads directly from the inner vessel to the support brackets, with a minimum of loading of the outer vessel.
(5) Ability to withstand the temperature gradients imposed, without these gradients causing either high thermal stresses or a slackening in the components of the support. This feature is desirable from a fatigue resistance and dynamics standpoint.
(6) High rigidity; that is, small deformation in the support with a full inner vessel subjected to maneuver loading. If this requirement is met, the full inner vessel and support combination will have a high natural frequency.
(7) Ease of assembly of the support and of the entire dewar.
(8) A support connection to the inner vessel which will not impose membrane and bending stresses in the inner vessel above the allowable design stress.

The principal object of this invention is to provide a support for a double-walled dewar having the foregoing characteristics. Such a dewar is therefore especially useful in locations where frequent and rapid change in position and/or direction of travel are encountered. Other objects will appear as the description proceeds.

The support of this invention makes use of the low thermal conductivity and high load-carrying capacity of multiple-contact supports—specifically a large number of nested conical plates or washers—in a vacuum.

This invention will now be described in detail in connection with the accompanying drawings which are intended to be illustrative rather than limiting and wherein.

Figure 1:
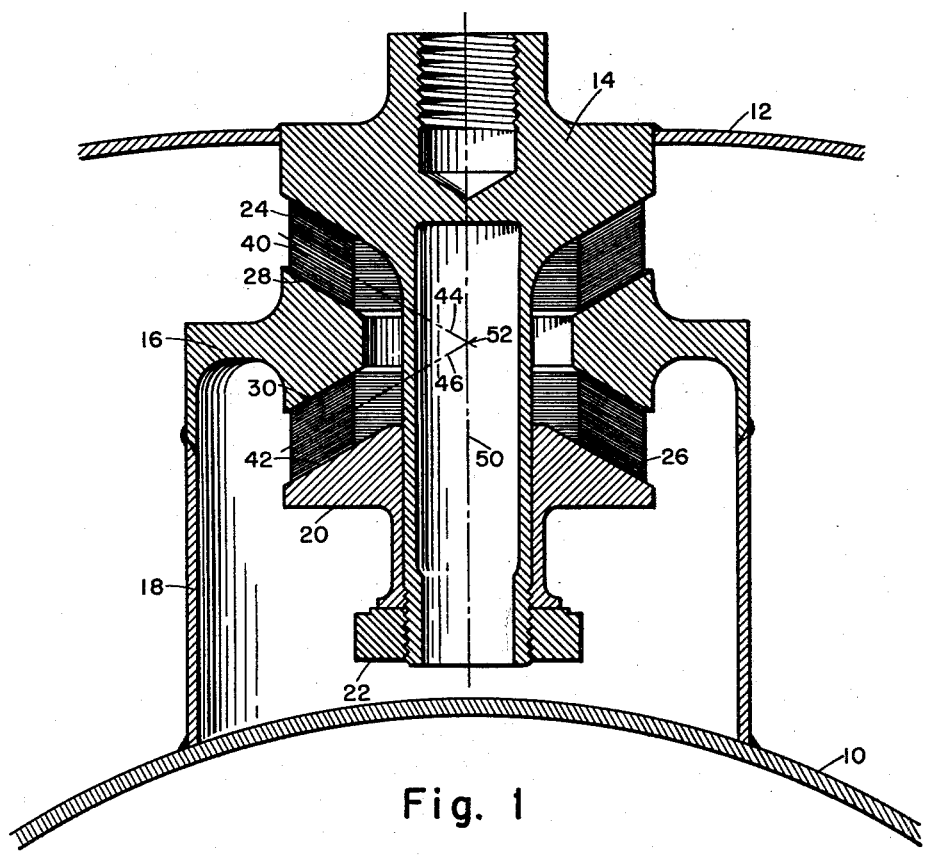
FIG. 1 is a vertical cross section through the center axis of a preferred form of support means of this invention.
Figure 2:
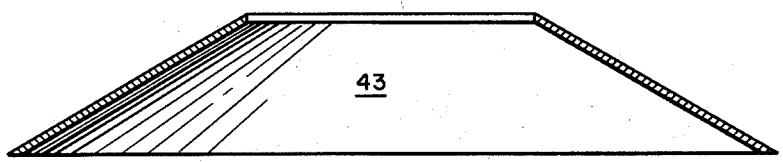
FIG. 2 is a vertical cross section of one of the conical plates or washers, much enlarged.

FIG. 1 shows an inner dewar shell 10 supported from outer dewar shell 12 by the support means of this invention. This support means consists of a center tension member 14, center compression member 16, cylindrical member 18, lower contact support 20, and nut 22; together with the nests of conical plates or washers 40 and 42. Center tension member 14 is provided at its upper end with a shoulder having a sloping conical face 24. Lower contact support 20 likewise has a shoulder provided with a sloping conical face 26. The center compression member 16 has two conical faces 28, 30. Conical face 28 is parallel to face 24 and conical face 30 is parallel to face 26. Between faces 24 and 28 is a nest 40 of conical plates or washers and between faces 26 and 30 is another nest 42 of conical plates or washers. A single such plate or washer 43 is shown in enlarged detail in FIG. 2. Their faces are parallel to the faces 24 and 28, or 30 and 26—as the case may be—by which they are positioned. Nut 22 is threaded onto the inner end of center tension member 14 thereby serving to clamp the assembly firmly together when nut 22 is tightened.

The nests of conical plates or washers 40 and 42 are so arranged that the center line 44 of the nest of upper washers 40 and the center line 46 of the nest of lower washers 42 meet at the axial center axis 50 of the support means. Although line 44 makes the same angle with center axis 50 as does line 46, this is not necessary (although it is more convenient for manufacture if they do) so long as the two lines meet on center axis 50.

The support is assembled by placing a large number of the conical washers 43 on each side of center compression member 16 and inserting center tension member 14 therethrough. Lower contact support 20 is slipped over the lower end of center tension member 14 and nut 22 is screwed on and tightened until the assembly is firmly together. The assembly is then joined to the inner shell 10 by welding onto cylindrical member 18 which has previously been attached, as by welding, to shell 10. The outer end of the center tension member 14 is then welded to the outer shell 12.

The support of this invention is capable of taking the entire load parallel to the axis of the dewar and at least part of the load normal to the axis. The conical shape of the plates or washers 43 provides three advantages:

(1) Self-alignment of the conical washers.
(2) Capability of carrying loads normal as well as parallel to the axis of the dewar.
(3) Self-compensation of contraction of components of the support assembly when the inner vessel is filled with cold liquefied gas.

The first two of these advantages are self-explanatory. The third advantage has been demonstrated in practice and can be proved mathematically. In this connection it should be noted that if the washers and the center compression member 16 were made in the form of flat plates and faces, there would be a total axial contraction of several thousandths of an inch when the inner vessel is filled with a liquefied gas at a temperature of around 75–100° K. This contraction would cause slackness in the support unless some type of spring preloading had been applied. In the support device of this invention a preload is applied, by the tightening of nut 22 on center tension member 14, and this preload is not changed by temperature gradients.

When an object expands or contracts uniformly all surfaces maintain their same angular relationship. Therefore, the conical washers will remain nested even though the diameters of the colder washers are decreased. In this connection it will be noted that the point 52 on center axis 50 at which the center lines 44 and 46 meet is a point of symmetry for the two sets of washers and may be taken as the center of contraction. As long as lines 44 and 46 meet on center axis 50, it is immaterial where on 50 they meet. For the conical washers, the change in axial height is the only dimensional change which affects the preload. Radial contraction of the colder washers will cause a sliding between them but the washers will remain nested. It is found in practice, and can be demonstrated mathematically that the change in vertical height for the stack of conical washers is compensated by the change due to axial contraction. Consequently, the preload in the support of this invention remains essentially unchanged.

The diameters, heights and angles of the two nests of conical washers may vary considerably as long as the center lines of the nests of washers meet at the axial center line of the support. This rule applies when the same material is used for center compression member 16 and for the conical washers. The preload however may be maintained when different materials are used such as aluminum for the center compression member and stainless steel for the conical washers if the distance between the center lines of the nests of washers at the axial center line of the support compensates for the difference in coefficients of thermal contraction of the two materials. The washers in each nest are all of the same size and shape, but are not necessarily of the same size and shape as those in the other nests.

The cross sectional area of the conical washers, which with member 16 constitute the compression members of the support, is preferably over 10 times the cross sectional area of the center tension member 14. An axial load on the support therefore principally causes a decrease in load in one stack of conical washers and only a slight increase in load in the other stack and in the center tension member 14. The preload on the support, effected by the tightening of nut 22, is made greater than the largest maneuver load expected to be applied on the support when the inner vessel of the dewar is full of liquefied gas. This feature decreases the susceptibility of the support to fatigue failure. It also makes the natural frequency of the support-inner vessel combination high for vibrations in the direction of the axis of the dewar.

As an example of a suitable support for the purposes of this invention for use in a dewar having a capacity of 350 pounds of liquid nitrogen we may use a series of 250 washers 43 in nest 40 and a like number of washers 43 in nest 42. Each such washer has a thickness of .002 inch and has an interior diameter of 1¾ inches. The center lines 44 and 46 of the two nests of washers are at an angle of 30° with a plane passing through point 52 normal to axis 50. The heat leak through this support is approximately 20 B.t.u. per hour, or somewhat less. The temperature of the portion of the support external to outer shell 12 is about 20–25° F. below the ambient air temperature.

The support of this invention provides a high resistance to heat leak, carries the inner vessel loads directly to the support bracket, provides and maintains a very rigid supporting means, allows for thermal contractions and expansions with no additional stresses imposed and with no loss of load-carrying ability, and permits an easy assembly of the dewar with bench-assembled supports.

We claim:

1. Support means for the inner vessel of a double-walled container comprising an elongated tension member having a shoulder at one end and being attached at that end to the outer vessel of said container, a compression member attached to the inner vessel of said container and positioned circumferentially of and spaced away from said tension member, said compression member having two conical faces, a contact member mounted on said tension member, a plurality of thin conical washers nested upon each of said conical faces, and being positioned between said compression member and said shoulder, and between said compression member and said contact member, and means for applying and maintaining a fixed preload upon said conical washers during changes in temperature, position and loading of said inner vessel.

2. Support means for the inner vessel of a double-walled container comprising two nests of conical washers each nest consisting of a plurality of identical washers, the center line of each nest converging with that of the other nest toward the common axis of said nests of washers, a compression member between and in contact with said two nests and having conical faces conforming with the washers against which said faces are in contact, a tension member extending axially of said nests and said compression member and out-of-contact with the latter, two shoulders associated with said tension member, one on each side of said compression member and its contacting nest of washers, each such shoulder having a conical face in contact with one of said nests of washers, and means for applying and maintaining a fixed preload upon said conical washers and said compression member during changes in temperature, position and loading of said inner vessel; said inner vessel being attached to said compression member, said tension member being attached at one end to the outer vessel of said double-walled container.

3. Support means for the inner vessel of a double-walled container comprising two nests of conical washers each nest consisting of a plurality of identical washers, the center line of each nest converging with that of the other nest toward the common axis of said nests of washers, a compression member between and in contact with said two nests and having conical faces conforming with the washers against which said faces are in contact, a tension member extending axially of said nests and said compression member and out-of-contact with the latter, and means associated with said tension member for applying and maintaining a fixed preload upon said conical washers and said compression member during changes in temperature, position and loading of said inner vessel; said inner vessel being attached to said compression member, said tension member being attached at one end to the outer vessel of said double-walled container.

4. Support means for the inner vessel of a double-walled container comprising a first nest of conical washers all of the same size and shape, a second nest of conical washers all of the same size and shape, a compression member between said nests and against which said nests bear, said compression member being attached to said inner vessel, and a tension member positioned axially of said washers and said compression member and spaced therefrom, said tension member arranged to exert pressure upon said nests in a direction toward said compression member, said tension member being attached to the outer wall of said double-walled container; the two center lines of said washers meeting at the axis of said washer and said tension member.

References Cited in the file of this patent
UNITED STATES PATENTS

| | | |
|---|---|---|
| 2,729,357 | Nason et al. | Jan. 3, 1956 |
| 2,900,182 | Hinks | Aug. 18, 1959 |
| 3,080,086 | James | Mar. 5, 1963 |